(12) United States Patent
Chung et al.

(10) Patent No.: US 11,990,818 B2
(45) Date of Patent: May 21, 2024

(54) IN-WHEEL MOTOR FOR ELECTRIC VEHICLE AND SEALING APPARATUS FOR PROTECTING IN-WHEEL MOTOR

(71) Applicant: MOTEK Incorporated Co., Ltd, Incheon (KR)

(72) Inventors: Jae Woong Chung, Incheon (KR); Hye-Young Jeong, Gimpo-si (KR); Mi-Rim Jung, Gimpo-si (KR)

(73) Assignee: MOTEK INCORPORATED CO., LTD, Incheon (KR)

( * ) Notice: Subject to any disclaimer, the term of this patent is extended or adjusted under 35 U.S.C. 154(b) by 244 days.

(21) Appl. No.: 17/727,474

(22) Filed: Apr. 22, 2022

(65) Prior Publication Data

US 2023/0261539 A1 Aug. 17, 2023

(30) Foreign Application Priority Data

Feb. 17, 2022 (KR) ........................ 10-2022-0021014

(51) Int. Cl.
*H02K 5/10* (2006.01)
*B60K 7/00* (2006.01)
*F16J 15/52* (2006.01)
*H02K 7/00* (2006.01)
*H02K 7/08* (2006.01)

(52) U.S. Cl.
CPC ............. *H02K 5/10* (2013.01); *B60K 7/0007* (2013.01); *F16J 15/52* (2013.01); *H02K 7/003* (2013.01); *H02K 7/08* (2013.01)

(58) Field of Classification Search
CPC .. H02K 5/10; H02K 7/003; H02K 7/08; F16J 15/52; B60K 7/0007
USPC .................................................. 310/90, 67 R
See application file for complete search history.

(56) References Cited

U.S. PATENT DOCUMENTS

| 2019/0100277 A1* | 4/2019 | Duhamel | ............... H02K 11/33 |
| 2021/0313851 A1* | 10/2021 | Zhou | ....................... H02K 1/145 |

FOREIGN PATENT DOCUMENTS

CN 113691070 * 11/2021 ............. H02K 7/003

* cited by examiner

*Primary Examiner* — Terrance L Kenerly
(74) *Attorney, Agent, or Firm* — STIP Law Group, LLC

(57) ABSTRACT

An in-wheel motor for an electric vehicle is provided, including a motor body (1) including a wheel hub (11) on one side, and a sealing apparatus (2) mounted to the motor body (1) on the opposite side to the wheel hub (11), in which the sealing apparatus (2) includes a first support (510) fixedly coupled to a motor shaft (14) of the motor body (1), a second support (520) fixedly coupled to the motor shaft (14) and disposed outside the first support (520), a third support (530) covering an outer surface of the first support (510) and an outer circumferential surface of the second support (520), and rotated when the motor is operated, and a fourth support (540) coupled to an outer surface of the second support (520) and rotated when the motor is operated.

13 Claims, 14 Drawing Sheets

1

(a)

(b)

(a)

(b)

(a)

(b)

(a)

(b)

(a)

(b)

IN-WHEEL MOTOR FOR ELECTRIC VEHICLE AND SEALING APPARATUS FOR PROTECTING IN-WHEEL MOTOR

CROSS-REFERENCE TO RELATED APPLICATION

This application claims priority to Korean Patent Application No. 10-2022-0021014, filed in the Korean Intellectual Property Office on Feb. 17, 2022, the entire contents of which are hereby incorporated by reference.

TECHNICAL FIELD

The present disclosure relates to an in-wheel motor for an electric vehicle and a sealing apparatus for protecting the same, and more particularly, to an in-wheel motor for an electric vehicle and a sealing apparatus for implementing a complete protection function therefor.

BACKGROUND ART

For a driving motor for electric vehicles, various types of electric motors are developed and applied to vehicles. Among them, in-wheel motor is the most innovative form of electric vehicle motor suitable for market demand. This is true because the in-wheel motor has excellent space utilization in designing a finished vehicle, can lower the vehicle's center of gravity, and reduce the body weight. Therefore, the in-wheel motor has recently been in the spotlight for motors for electric vehicles.

The in-wheel motor is installed in the wheel of the vehicle and directly drives the tire, so that there is an advantage that the space for installing the engine can be used for other purposes, and that components such as power transmission gears, transmissions, differential gears, and the like are unnecessary, which makes vehicle manufacturing very simple. In addition, the reduction in the number of vehicle components by about 60% or more facilitates the efficient production of finished vehicles, and greatly contributes in reducing the weight of the vehicle. Therefore, the importance of in-wheel motors is increasing.

The in-wheel motor for the electric vehicle should be mounted in the wheels of vehicles with limited space conditions. Therefore, it is inevitable that the in-wheel motor for the electric vehicle is manufactured with complex structure in which mechanical, electrical, and electronic structures such as motor windings, ball bearings for support, and so on are mixed with each other.

In addition, it is required that the in-wheel motor for the electric vehicle be able to operate without problems on not only paved roads that are easy to drive, but also unpaved roads and in harsh environments such as poor road conditions with river, sea, muddy water, and the like.

In addition, in terms of climate environment, the in-wheel motor for the electric vehicle should not have any problems in operation not only in cold regions with low temperature conditions but also in tropical regions with high temperature conditions. In particular, since the in-wheel motor is a combination of complex electrical, electronic, and mechanical structures, it should be protected to ensure that there is no ingress of external foreign substances such as moisture, salt, mud, and the like into the motor.

Therefore, it is required that the in-wheel motor for the electric vehicle be able to start even in low temperature conditions (about −54° C.), not leak even in high temperature conditions (about +35° C.), and manufactured in a structure that can be protected from ingress of foreign substances.

SUMMARY

An object of the present disclosure is to provide an in-wheel motor effectively protected from ingress of foreign substances and a sealing apparatus for protecting the in-wheel motor.

Technical Solution

According to an embodiment, an in-wheel motor for an electric vehicle is provided, which may include a motor body 1 including a wheel hub 11 on one side, and a sealing apparatus mounted to the motor body 1 from an opposite side to the wheel hub 11, in which the sealing apparatus 2 may include a first support 510 fixedly coupled to a motor shaft 14 of the motor body 1, a second support 520 fixedly coupled to the motor shaft 14 and disposed outside the first support 520, a third support 530 covering an outer surface of the first support 510 and an outer circumferential surface of the second support 520, and rotated when the motor is operated, and a fourth support 540 coupled to an outer surface of the second support 520 and rotated when the motor is operated.

In the sealing apparatus 2, a plurality of first labyrinth forming protrusions 521a may be formed on the outer surface of the second support 520, a plurality of second labyrinth forming protrusions 541a may be formed on an inner surface of the fourth support 540, and the first labyrinth forming protrusions 521a and the second labyrinth forming protrusions 541a may be arranged adjacent to each other and alternately arranged along a radial direction of the motor, so that a gap between the second support 520 and the fourth support 540 may have a labyrinth structure 800.

The sealing apparatus 2 may further include an encased seal 640 disposed between the second support 520 and the third support 530.

the encased seal 640 may include a case 643, first and second sealing members 641 and disposed in close contact with each other within the case 643, a diaphragm 644 and a plurality of spring members 646 for elastically supporting the second sealing member 642, and a grease G filled in an empty space between an inner surface of the case 643 and the diaphragm 644, and when the motor is operated, the grease G may be automatically supplied to a seal joint surface between the first and second sealing members 641 and 642 by a pumping pressure generated by a vibration of the diaphragm 644 and the spring member 646.

In the sealing apparatus 2, a diamond-like carbon (DLC) coating film may be coated on each of opposite surfaces of the first and second sealing members 641 and 642, The sealing apparatus 2 may further include a first bearing 610 mounted between the first support 510 and the third support 530, and a second bearing 620 and 630 mounted between the second support 520 and the third support 530.

The sealing apparatus 2 may further include O-rings 710 and 720 disposed between the second bearing 620 and 630 and the third support 530, and an O-ring 730 disposed between the encased seal 640 and the third support 530.

The motor body 1 may include a main motor 100 and auxiliary motors 200 and 300 disposed on left and right sides thereof, the main motor 200 may be provided as a radial flux motor in which a plurality of magnets 120 are arranged on an inner circumferential surface of a ring-shaped radial back iron 130, and the auxiliary motors 200 and 300 may be provided as axial flux motors in which a plurality of magnets 220 and 320 are arranged on inner surfaces of disk-shaped axial back irons 230 and 330.

According to another embodiment, a sealing apparatus 2 provided in an in-wheel motor for an electric vehicle is provided, in which the in-wheel motor for the electric vehicle may include a motor body 1 including a wheel hub 11 on one side, the sealing apparatus 2 may be mounted on the motor body 1 on the opposite side to the wheel hub 11, and the sealing apparatus may further include a first support 510 fixedly coupled to a motor shaft 14 of the motor body 1, a second support 520 fixedly coupled to the motor shaft 14 and disposed outside the first support 520, a third support 530 covering an outer surface of the first support 510 and an outer circumferential surface of the second support 520, and rotated when the motor is operated, and a fourth support 540 coupled to an outer surface of the second support 520 and rotated when the motor is operated.

According to various embodiments, between the fixed support and the rotating support that form the sealing apparatus for the in-wheel motor, the sealing apparatus is formed with a gap of a labyrinth structure providing a sealing function, and with an addition of the encased seal that is employed together, it is possible to completely block the ingress of foreign substances into the motor body from the outside.

According to various embodiments, since the encased seal employed in the sealing apparatus is designed to have a self-lubricating function, grease is automatically supplied to the seal joint surface when the motor is operated, thus maintaining smooth lubrication.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Hereinafter, an in-wheel motor and a sealing apparatus provided therein according to embodiments of the present disclosure will be described in more detail with reference to the drawings.

Figure 1:
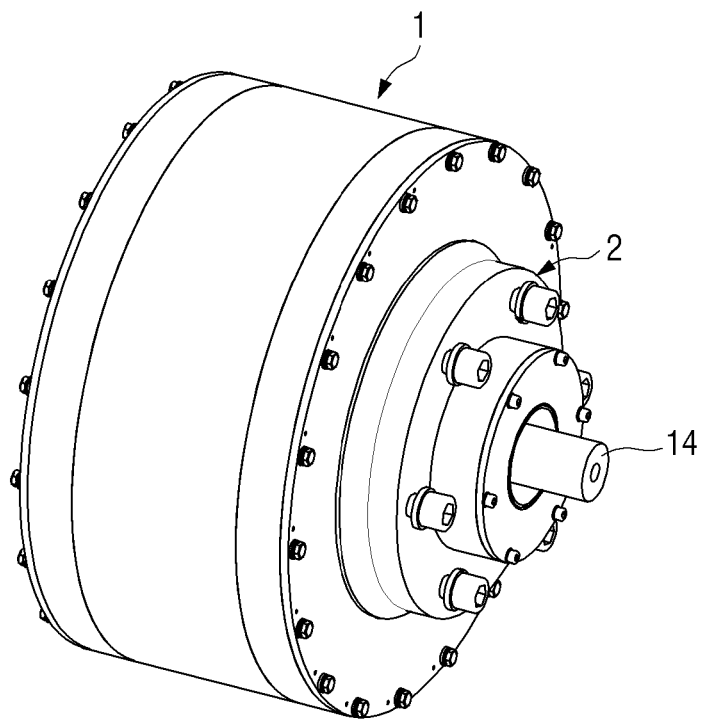
FIG. 1 illustrates an in-wheel motor 10 for an electric vehicle according to an embodiment.
Figure 2:
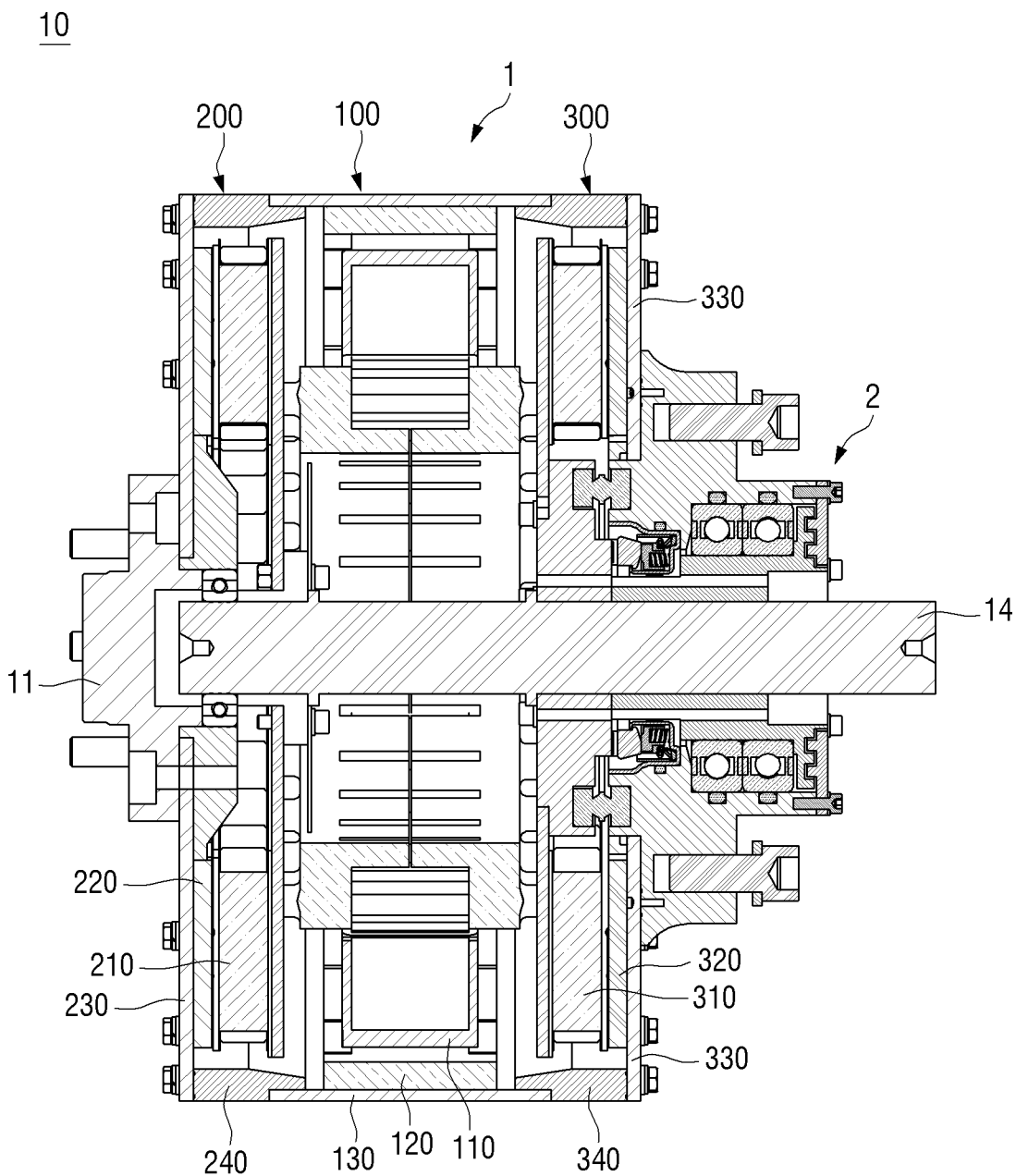
FIG. 2 shows a cross section of the in-wheel motor 10 of FIG. 1.
Figure 3:
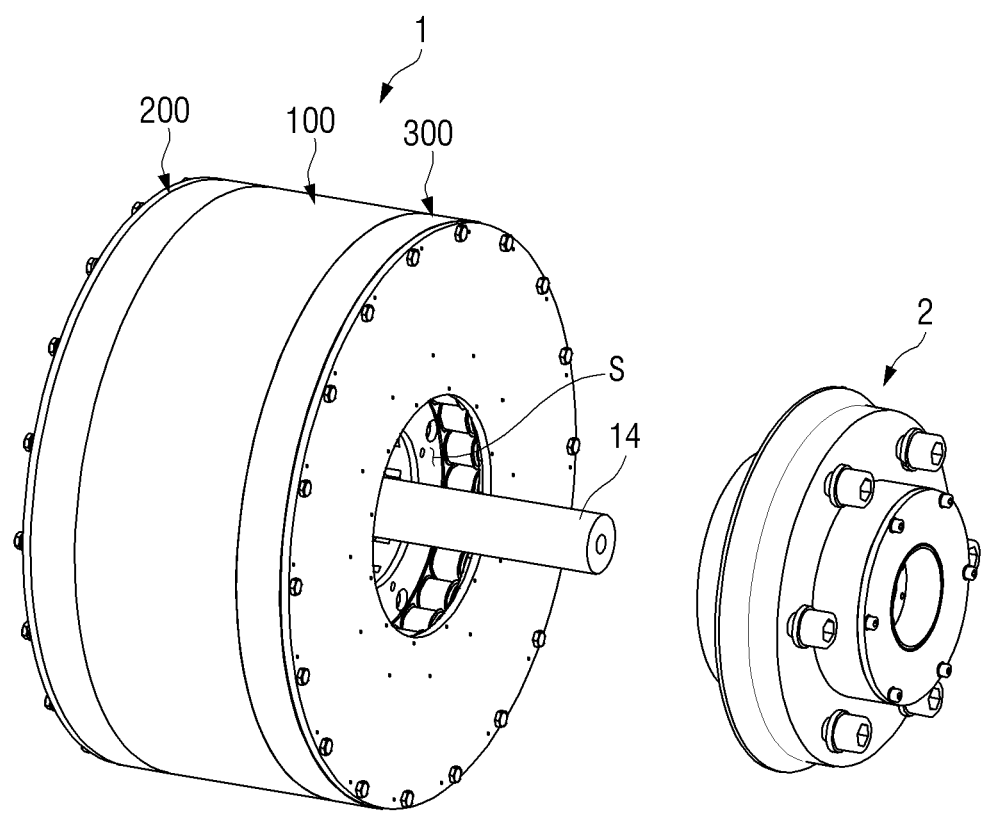
FIG. 3 illustrates the in-wheel motor 10 of FIG. 1 by dividing it into a motor body 1 and a sealing apparatus 2.

FIG. 1 illustrates an in-wheel motor 10 for an electric vehicle according to an embodiment, FIG. 2 shows a cross section of the in-wheel motor 10 of FIG. 1, and FIG. 3 illustrates the in-wheel motor 10 of FIG. 1 by dividing it into a motor body 1 and a sealing apparatus 2.

Referring to FIGS. 1 to 3, the in-wheel motor 10 for the electric vehicle according to an embodiment may be a motor installed in a wheel of a vehicle to directly drive a tire. The in-wheel motor 10 provides various advantages such as saving the space for installing the engine and utilizing this space for other purposes, simpler vehicle manufacturing because power transmission gears, transmissions, differential gears, and the like are unnecessary, reduced number of vehicle components by about 60% or more and subsequent facilitation of the production of finished vehicles, contribution to greatly reduced weight of the vehicle, and the like.

A wheel hub 11 is provided on one side of the in-wheel motor 10. The wheel hub 11 is a part that is coupled to the tire wheel and includes a plurality of wheel bolts fastened to the wheel. By selectively mounting the wheel hub 11 including different numbers of wheel bolts to the in-wheel motor 10, compatibility with various tire wheels can be achieved.

Referring to FIGS. 1 to 3, the in-wheel motor 10 according to an embodiment includes a motor body 1 and a sealing apparatus 2.

The motor body 1 is a part that generates power using electricity. The sealing apparatus is mounted on the motor body 1 on the opposite side to the wheel hub 11 and serves to prevent ingress of external foreign substances from entering into the motor body 1.

As illustrated in FIG. 3, the motor body 1 has an empty space S around a motor shaft 14 on opposite side to the wheel hub 11. When external foreign substances such as moisture, salt, mud, and the like enter the motor body 1 through this empty space S, a failure or malfunction of the in-wheel motor 10 may occur. The main function of the sealing apparatus 2 mounted on one side of the motor body 1 is to prevent foreign substances from entering a motor 10 through the empty space S.

Figure 4:
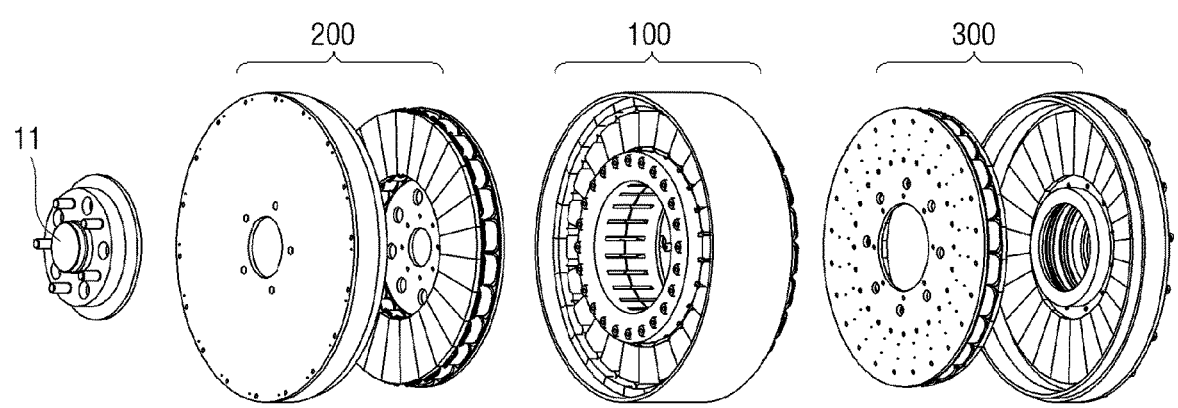
FIG. 4 is an exploded view of the motor body 1 illustrated in FIG. 3.

FIG. 4 is an exploded view of the motor body 1 illustrated in FIG. 3.

As illustrated in the drawing, the motor body 1 according to an embodiment may be manufactured in a triple motor structure that combines three motors including a main motor 100 and auxiliary motors 200 and 300 disposed on the left and right sides of the main motor 100.

When the main motor 100 does not operate normally in an emergency situation such as failure, electrical short, short circuit, or the like of an electronic circuit, the auxiliary motors 200 and 300 may operate to maintain a drivable state.

In addition, when high power output is required, the main motor 100 and the auxiliary motors 200 and 300 may be simultaneously operated to generate high output and high torque. In addition, when efficient motor output operation is required to prolong the battery mileage, by allowing adjustment of the amount of energy required to operate the motor according to the amount of torque or output required in a way that selectively changes the driving mode by a motor control device, it is possible to achieve the maximum battery mileage under optimal driving conditions.

In addition, a sports car or luxury vehicle requires a fast zero to 100, and in order to meet this requirement, the three motors 100, 200, and 300 are driven to generate maximum output and maximum torque, so that it is possible to start from a standstill and reach a speed of 100 km/h (60 mph) in the fastest time.

Figure 5:
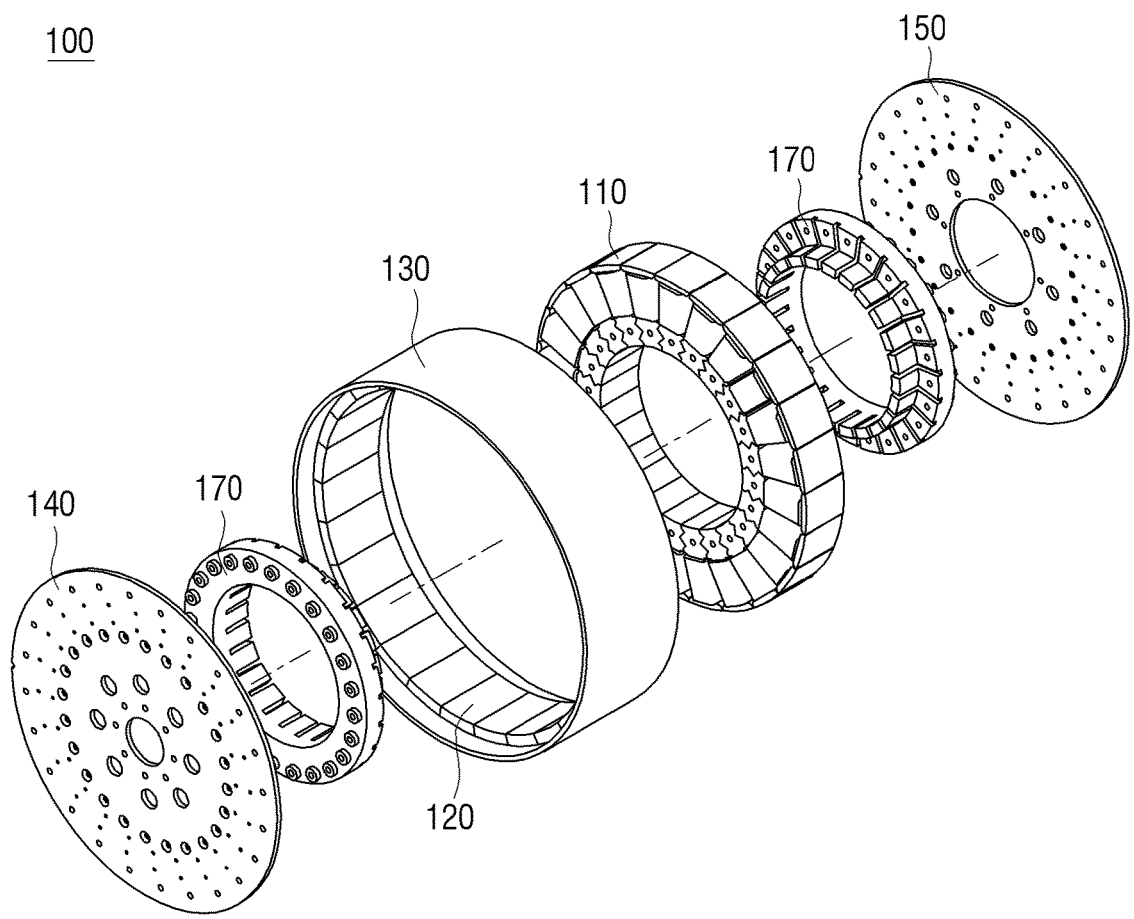
FIG. 5 is an exploded view of a main motor 100 illustrated in FIG. 4.
Figure 6A:
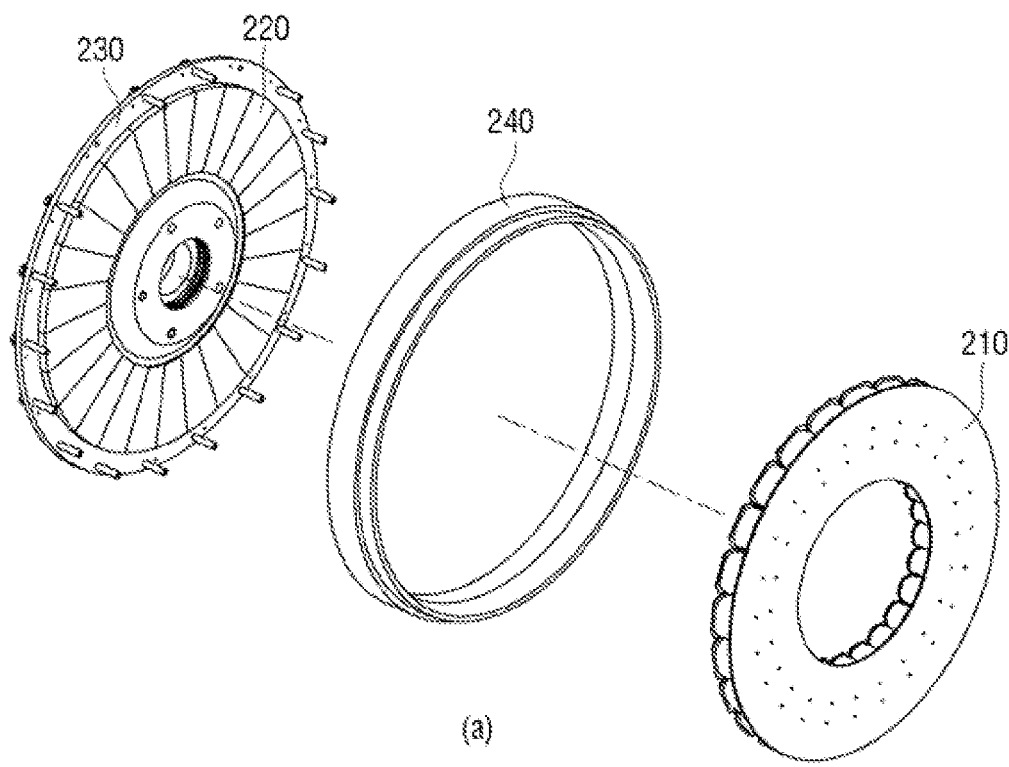
FIG. 6A and FIG. 6B are an exploded view of a left auxiliary motor 200 illustrated in FIG. 4.
Figure 6B:
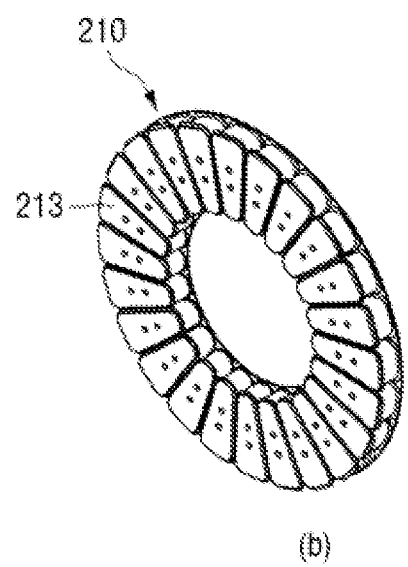
Figure 7A:
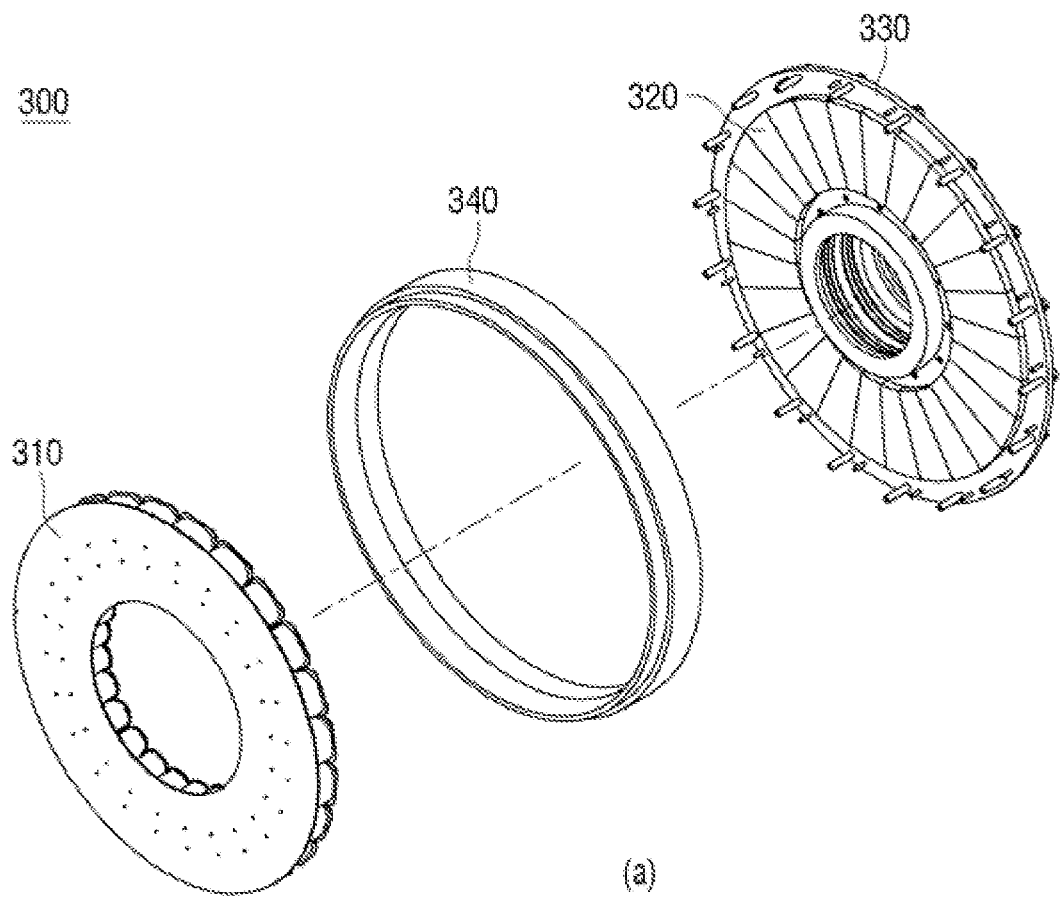
FIG. 7A and FIG. 7B are an exploded view of a right auxiliary motor 300 illustrated in FIG. 4.
Figure 7B:
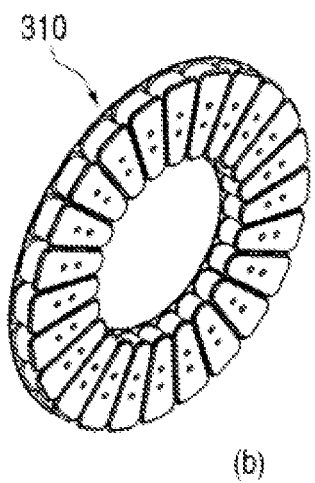

FIG. 5 is an exploded view of the main motor 100 illustrated in FIG. 4, FIG. 6 is an exploded view of the left auxiliary motor 200 illustrated in FIG. 4, and FIG. 7 is an exploded view of the right auxiliary motor 300 illustrated in FIG. 4.

As illustrated in FIG. 5, the main motor 100 may be manufactured in a structure including a stator 110, a plurality of magnets 120, a radial back iron 130, a pair of back irons 140 and 150, and a pair of support rings 170.

The stator 110 includes a plurality of coils for providing an electric field, and is fixedly coupled to the motor shaft 14 through the pair of support rings 170. The plurality of magnets 120 are provided on an inner circumferential surface of the radial back iron 130, and the plurality of magnets 120 are arranged to surround the stator 110. The plurality of magnets 120 and the radial back iron 130 form the rotor of the main motor 100, and when current is supplied to the stator 110, electromagnetic force is generated to rotate the rotor. The pair of back irons 140 and 150 are fixedly arranged at the boundaries between the main motor 100 and the left and right auxiliary motors 200 and 300 and serve to support stators 210 and 310 of the left and right auxiliary motors 200 and 300.

As illustrated in FIG. 6, the left auxiliary motor 200 may be manufactured in a structure that includes the stator 210, the plurality of magnets 220, the axial back iron 230, and a connection ring 240.

The stator 210 includes a plurality of coil parts 213 for providing an electric field, and is fixedly coupled to the motor shaft 14. The axial back iron 230 is disposed opposite to the stator and includes the plurality of magnets 220 on the inner surface thereof. The axial back iron and the plurality of magnets 220 construct the rotor of the left auxiliary motor 200, and when current is supplied to the stator 210, electromagnetic force is generated to rotate the rotor. The connection ring 240 is a part that connects the axial back iron 230 to the radial back iron 130 of the main motor 100. Accordingly, the axial back iron 230 of the left auxiliary motor 200 and the radial back iron 130 of the main motor 100 are interlocked via the connection ring 240 so as to be rotated together.

As illustrated in FIG. 7, the right auxiliary motor 300 may be manufactured in a structure that includes the stator 310, the plurality of magnets 320, the axial back iron 330, and a connection ring 340.

The stator 310 includes a plurality of coil parts for providing an electric field, and is fixedly coupled to the motor shaft 14. The axial back iron 330 is disposed opposite to the stator and includes the plurality of magnets 320 on the inner surface thereof. The axial back iron and the plurality of magnets 320 construct the rotor of the right auxiliary motor 300, and when current is supplied to the stator 310, electromagnetic force is generated to rotate the rotor. The connection ring 340 is a part that connects the axial back iron 330 to the radial back iron 130 of the main motor 100. Accordingly, the axial back iron 330 of the the right auxiliary motor 300 and the radial back iron 130 of the main motor 100 are interlocked via the connection ring 240 so as to be rotated together.

Referring to FIGS. 5 to 7, when the in-wheel motor 10 is operated, the rotors 120 and of the main motor 100, the rotors 220 and 230 of the left auxiliary motor 200, and the rotors 320 and 330 of the right auxiliary motor 300 are rotated together.

In the present disclosure, the main motor 100 has a radial flux motor structure in which the plurality of magnets 120 are arranged on the inner circumferential surface of the ring-shaped radial back iron 130, and the left and right auxiliary motors 200 and 300 have an axial flux motor structure in which the plurality of magnets 220 and 320 are arranged on the inner surface of the disk-shaped axial back irons 230 and 330.

Referring back to FIG. 2, the stator 110 of the main motor 100, the stator 210 of the left auxiliary motor 200, and the stator 310 of the right auxiliary motor 30 are arranged inside the in-wheel motor 10, and the rotors 120 and 130 of the main motor 100, the rotors 220 and 230 of the left auxiliary motor 200, and the rotors 320 and 330 of the right auxiliary motor 300 are arranged outside the in-wheel motor 10. As described above, the in-wheel motor 10 according to an embodiment has a so-called outer rotor type motor structure in which stators are arranged inside the motor and rotors are arranged outside the motor.

Figure 8:
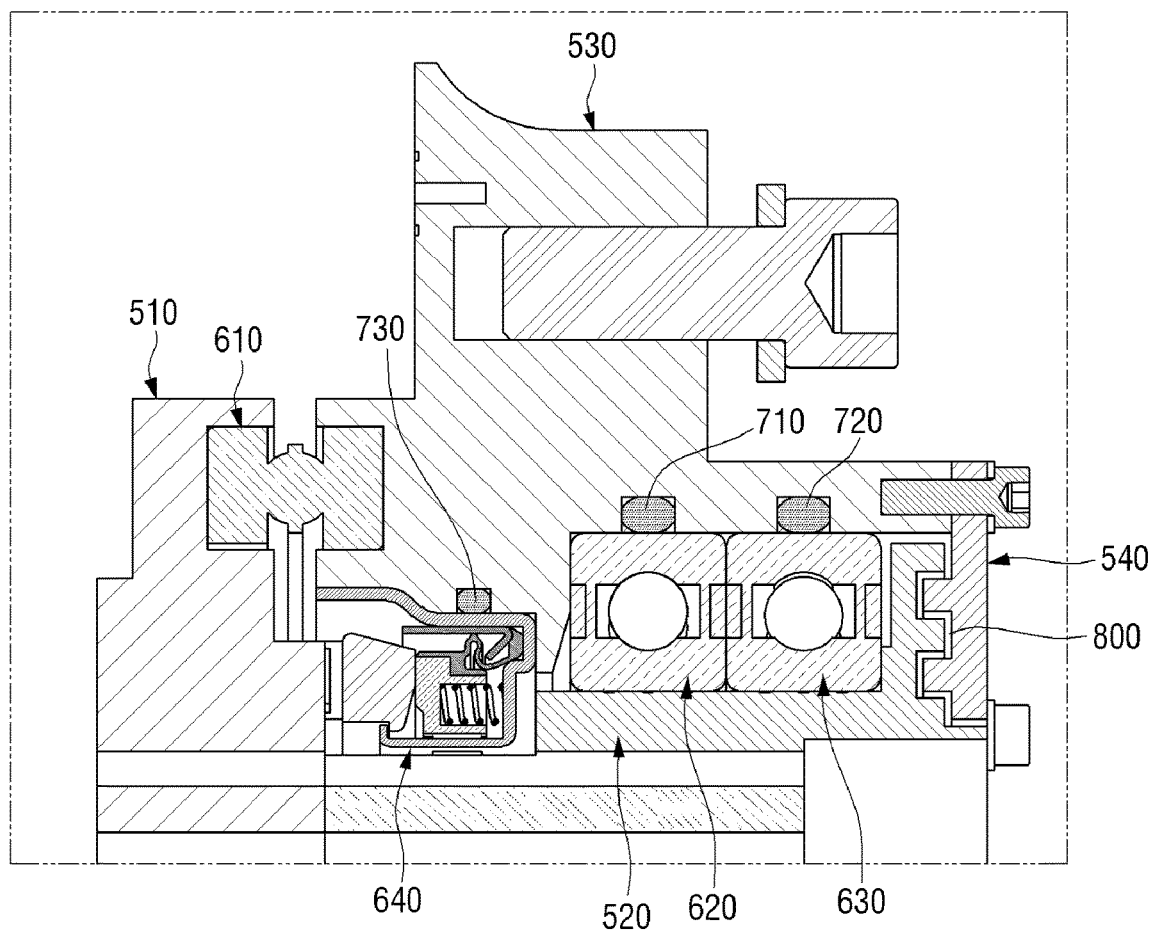
FIG. 8 is a partial cross-sectional view illustrating the sealing apparatus 2 of FIG. 3.
Figure 9:
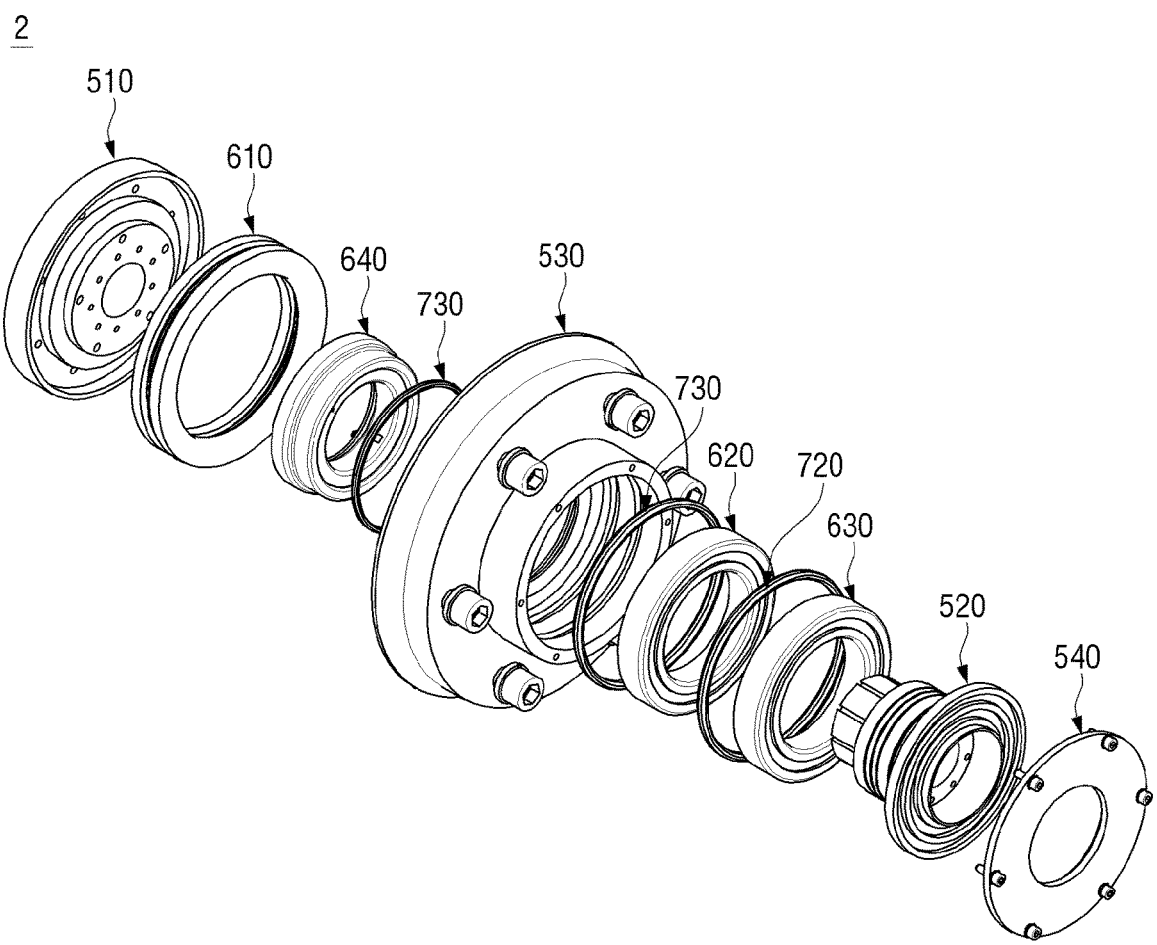
FIG. 9 is an exploded view of the sealing apparatus 2 of FIG. 3.

FIG. 8 is a partial cross-sectional view illustrating the sealing apparatus 2 of FIG. 3, and FIG. 9 is an exploded view of the sealing apparatus 2 of FIG. 3.

Referring to FIGS. 8 and 9, the sealing apparatus 2 according to an embodiment includes first to fourth supports 510, 520, 530, and 540.

The first and second supports 510 and 520 are fixed supports, which are fixedly coupled to the motor shaft 14 and in contact with each other along the direction of the motor axis. The first support 510 is disposed on the inside, and the second support 520 is disposed on the outside. The empty space S of the motor body 1 described above is covered by the first support 510 located inside.

The third and fourth supports 530 and 540 are rotational supports, which are in contact with each other in the direction of the motor axis. The third support 530 has an arrangement to cover an outer surface of the first support 510 and an outer circumferential surface of the second support 520. It is coupled to the axial back iron 330 of the right auxiliary motor 300 described above. Accordingly, when the motor is operated, the third support 530 is rotated together with the axial back iron 330. A disc brake (not illustrated) may be attached onto the outer surface of the third support 530. The fourth support 540 has an arrangement to cover an outer surface of the second support 520. The fourth support 540 is coupled to the outer surface of the third support 530, and is rotated together with the third support 530 when the motor is operated.

Referring to FIGS. 8 and 9, the sealing apparatus 2 according to an embodiment includes a first bearing 610 and a second bearing 620 and 630.

The first bearing 610 is a bearing mounted between the first support 510 as a fixed member and the third support 530 as a rotating member, and connects the third support 530 to the first support 510. The first bearing 610 is preferably provided as a thrust ball bearing so as to support a strong magnetic force in the inner direction of the motor (left direction in FIG. 8) acting on the third support 530.

The second bearing 620 and 630 is a bearing mounted between the second support 520 as a fixed member and the third support 530 as a rotating member, and connects the third support to the second support 520. As illustrated in FIG. 8, in order to increase the supporting force of the second bearings 620 and 630, the second bearing 620 and 630 may be provided as a pair. The second bearing 620 and 630 is preferably provided as a deep groove ball bearing.

Referring to FIGS. 8 and 9, the sealing apparatus 2 according to an embodiment includes an encased seal 640 and a plurality of O-rings 710, 720, and 730.

The encased seal 640 is mounted between the second support 520 as a fixed member and the third support 530 as a rotating member, and is disposed inward of the second bearing 620 and described above. The encased seal 640 serves to block foreign substances which may pass through the second bearing 620 and 630 from being introduced into the motor body 1.

The plurality of O-rings 710, 720, and 730 include the O-rings 710 and 720 disposed between the second bearing 620 and 630 and the third support 530, and the O-ring 730 disposed between the encased seal 640 and the third support 530. The plurality of O-rings 710, 720, and serve to block a gap between the second bearings 620 and 630 and the third support 530 and a gap between the encased seal 640 and the third support 530.

Figure 10A:
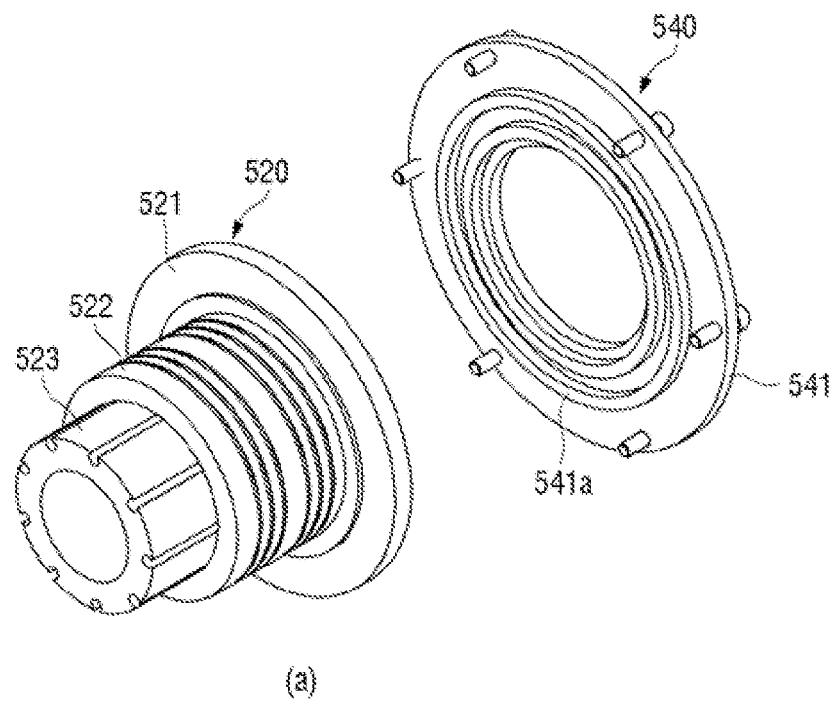
FIG. 10A and FIG. 10B are an enlarged view of a second support 520 and a fourth support 540 illustrated in FIG. 9.
Figure 10B:
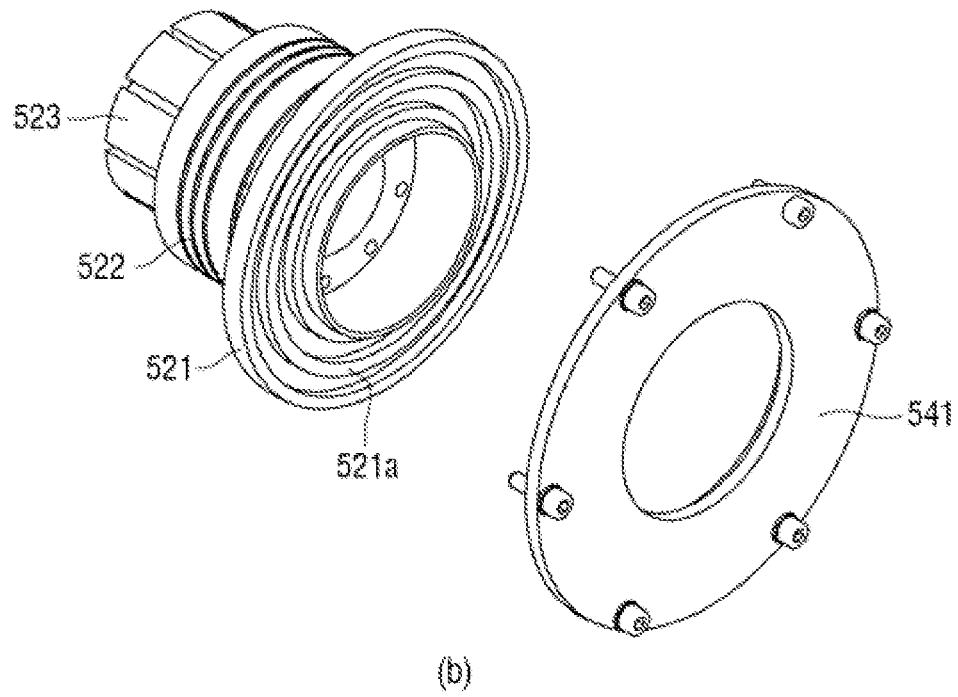
Figure 11A:
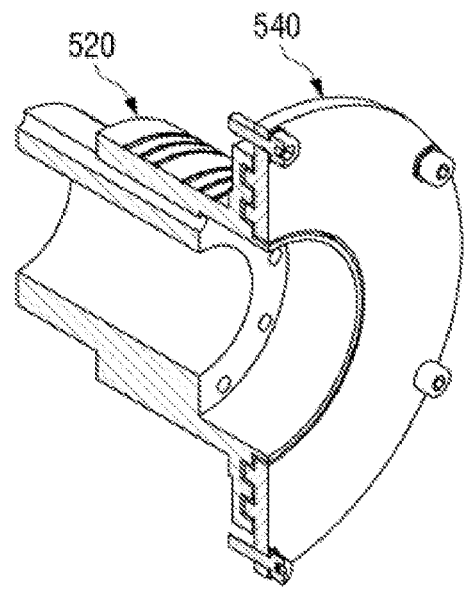
FIG. 11A and FIG. 11B illustrate the second support 520 and the fourth support 540 in a coupled state.
Figure 11B:
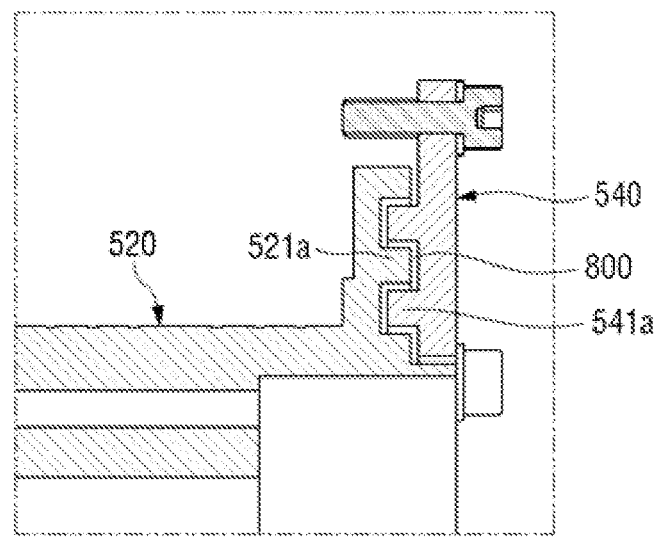

FIG. 10 is an enlarged view of the second support 520 and the fourth support 540 illustrated in FIG. 9, and FIG. 11 illustrates the second support 520 and the fourth support 540 in a coupled state.

Referring to FIGS. 10 and 11, the second support 520 includes a disk-shaped flange part 521, a cylindrical bearing mounting part 522 extending from an inner surface of the flange part 521, and a cylindrical seal mount 523 extending from an inner surface of the bearing mounting part 522. As illustrated in FIG. 10, the second support 520 is designed such that the flange part has a larger diameter than the bearing mounting part 522 and the seal mounting part 523 has a smaller diameter than the bearing mounting part 522.

A plurality of first labyrinth forming protrusions 521a protrude from an outer surface of the flange part 521.

The fourth support 540 includes a disk-shaped flange part 541, and a plurality of second labyrinth forming protrusions 541a protruding from an inner surface thereof.

Referring to FIG. 11, the first labyrinth forming protrusions 521a and the second labyrinth forming protrusions 541a are arranged adjacent to each other and alternately arranged along the radial direction of the motor. Accordingly, a gap between the first labyrinth forming protrusions 521a and the second labyrinth forming protrusions 541a has a labyrinth structure 800.

Preferably, the gap may be designed to have a width of about 0.5 mm.

As described above, since the second support 520 is a fixed member and the fourth support 540 is a rotating member, there is a gap between the two supports 520 and 540. In the present disclosure, the gap has the labyrinth structure 800 formed by the first labyrinth forming protrusions 521a and the second labyrinth forming protrusions 541a.

As described above, since the gap between the second support 520 and the fourth support 540 has the labyrinth structure 800, it is difficult for foreign substances to enter through the gap. According to the present disclosure, the gap of the labyrinth structure is narrow and tortuous, while the flow path has a maximized length, and accordingly, it is difficult for foreign substances that may be introduced into the gap to completely pass through the gap. This means that the gap of the labyrinth structure formed between the second support 520 and the fourth support 540 itself serves as a seal.

Figure 12A:
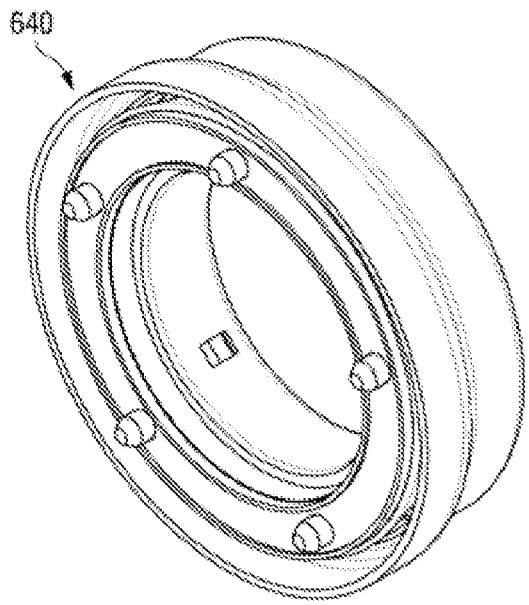
FIG. 12A and FIG. 12B are an enlarged view illustrating an encased seal 640 illustrated in FIG. 9.
Figure 12B:
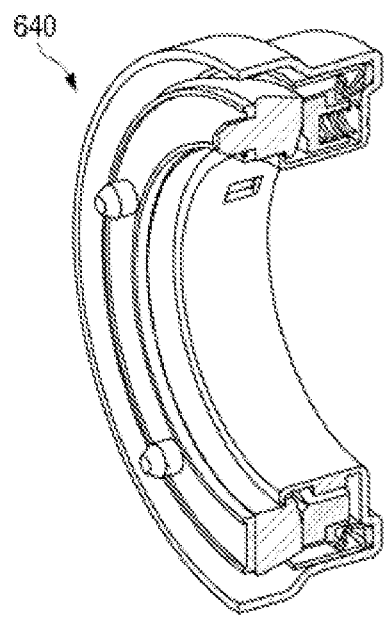
Figure 13:
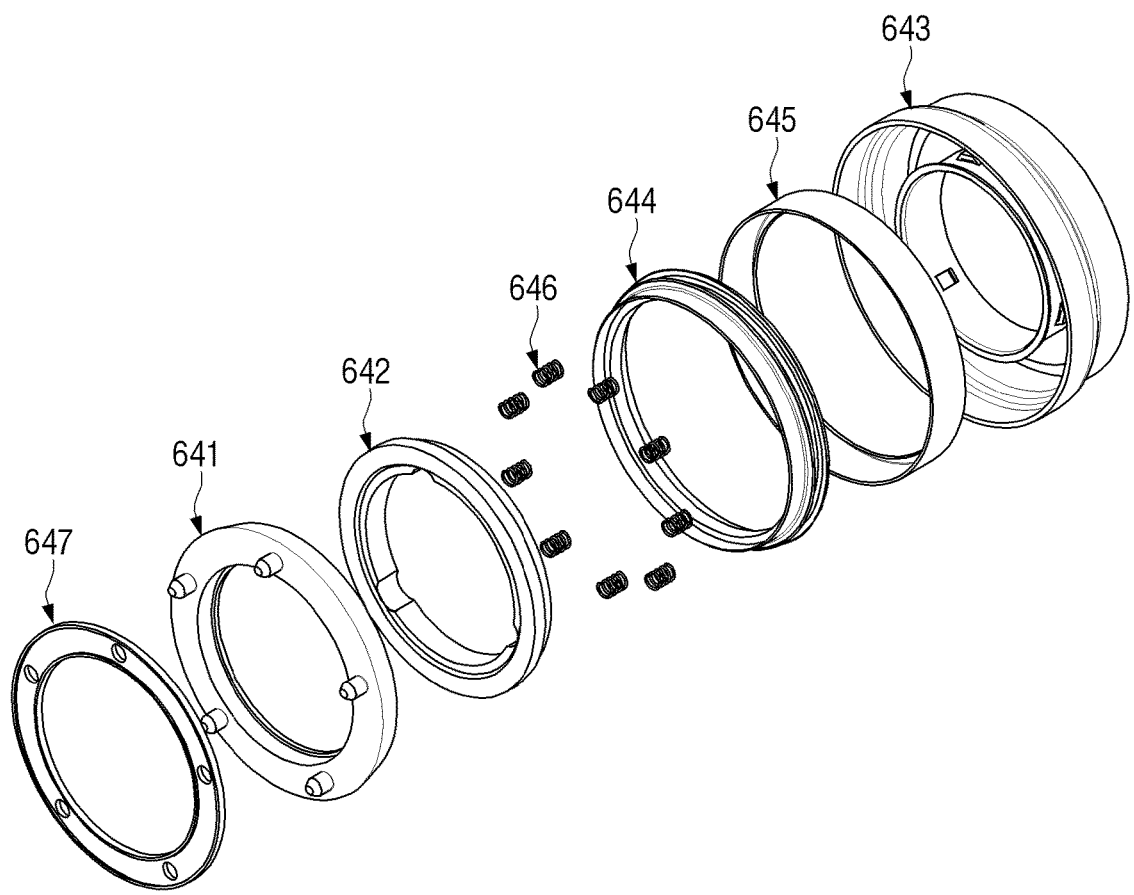
FIG. 13 is an exploded view of the encased seal 640.
Figure 14:
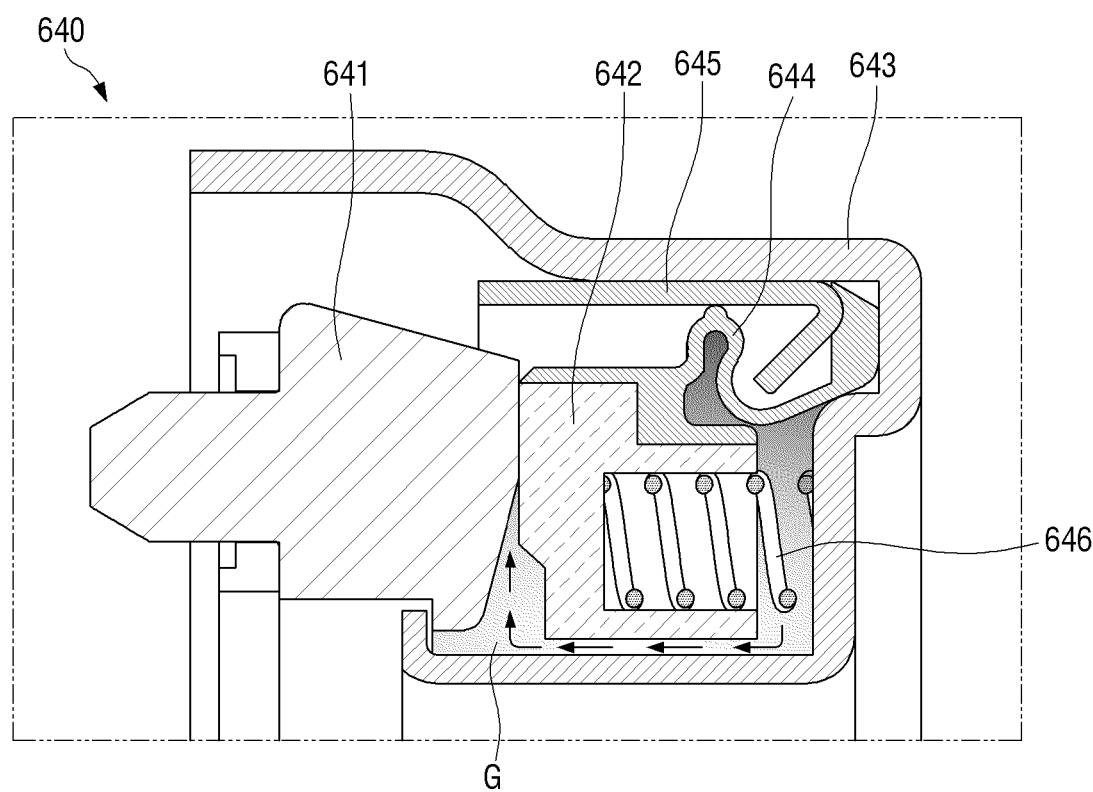
FIG. 14 is a partial cross-sectional view illustrating the encased seal 640.

FIG. 12 is an enlarged view illustrating the encased seal 640 illustrated in FIG. 9, FIG. 13 is an exploded view of the encased seal 640, and FIG. 14 is a partial cross-sectional view illustrating encased seal 640.

Referring to FIGS. 12 to 14, the encased seal 640 includes a first sealing member 641, a second sealing member 642, a case 643, a diaphragm 644, an inner case ring 645, a plurality of spring members 646, and a gasket member 647.

The first sealing member 641 and the gasket member 647 coupled thereto do not have rotational movement, while the remaining members 642, 643, 644, 645 and 646 have rotational movement when the motor is operated. The diaphragm 644 and the plurality of spring members elastically support the second sealing member 642 into a close contact with the first sealing member 641, and the inner case ring 645 serves to secure the diaphragm 644 to the case 643.

The first sealing member 641 and the second sealing member 642 are in close contact with each other, and when the motor is operated, relative sliding occurs between the first sealing member 641 and the second sealing member 642.

As illustrated in FIG. 14, the empty space between the inner surface of the case 643 and the diaphragm 644 is filled with grease G which serves to reduce friction between the seal joint surfaces.

When the motor is operated, the motor vibration is generated and transmitted to the diaphragm 644 and the spring member 646 to cause vibration in these members 644 and 646, and as a result, a pumping pressure is generated and the grease G is automatically supplied to the joint surface between the first and second sealing members 641 and 642, thus maintaining a smooth lubrication action.

As described above, the encased seal 640 according to an embodiment has a self-oil supply function in which the grease G is automatically supplied to the seal joint surface.

According to an embodiment, it is preferable to apply a special grease of MIL-G-10924 Grade as the grease G. With this special grease, the frictional resistance is maintained below 0.05 Nm even at a low temperature of −54° C., which prevents possible problem of vehicle driving in winter conditions.

Meanwhile, a diamond-like carbon (DLC) coating film is coated on each of opposite surfaces of the first and second sealing members 641 and 642.

DLC is a material with low surface energy, low microporosity, high hardness, eco-friendly properties, and excellent adhesion.

With the DLC coating film, it is possible to obtain excellent wear resistance, low coefficient of friction, and a very smooth surface.

By coating the DLC coating film, the frictional resistance between the two sealing members 641 and 642 can be greatly reduced, and thus the amount of heat generated by friction can also be greatly reduced. As a result, it is possible to significantly decrease the wear rate according to the use time of the encased seal 640. This means that the life of the encased seal 640 is greatly increased.

What is claimed is:
1. An in-wheel motor for an electric vehicle, comprising:
a motor body (1) including a wheel hub (11) on one side; and
a sealing apparatus (2) mounted to the motor body (1) on the opposite side to the wheel hub (11),
wherein the sealing apparatus (2) comprises:
a first support (510) fixedly coupled to a motor shaft (14) of the motor body (1);
a second support (520) fixedly coupled to the motor shaft (14) and disposed outside the first support (520);

a third support (530) covering an outer surface of the first support (510) and an outer circumferential surface of the second support (520), and rotated when the motor is operated; and
a fourth support (540) coupled to an outer surface of the second support (520) and rotated when the motor is operated,
wherein the sealing apparatus (2) further comprises an encased seal (640) disposed between the second support (520) and the third support (530).

2. The in-wheel motor according to claim 1, wherein a plurality of first labyrinth forming protrusions (521a) are formed on the outer surface of the second support (520), a plurality of second labyrinth forming protrusions (541a) are formed on an inner surface of the fourth support (540), and the first labyrinth forming protrusions (521a) and the second labyrinth forming protrusions (541a) are arranged adjacent to each other and alternately arranged along a radial direction of the motor, so that a gap between the second support (520) and the fourth support (540) has a labyrinth structure (800).

3. The in-wheel motor according to claim 1, wherein the encased seal (640) comprises:
a case (643);
first and second sealing members (641 and 642) disposed in close contact with each other within the case (643);
a diaphragm (644) and a plurality of spring members 646 for elastically supporting the second sealing member (642); and
a grease (G) filled in an empty space between an inner surface of the case (643) and the diaphragm (644), and when the motor is operated, the grease (G) is automatically supplied to a seal joint surface between the first and second sealing members (641 and 642) by a pumping pressure generated by a vibration of the diaphragm (644) and the spring member 646.

4. The in-wheel motor according to claim 3, wherein a diamond-like carbon (DLC) coating film is coated on each of opposite surfaces of the first and second sealing members (641 and 642).

5. The in-wheel motor according to claim 1, wherein the sealing apparatus (2) further comprises:
a first bearing 610 mounted between the first support (510) and the third support (530); and
a second bearing (620 and 630) mounted between the second support (520) and the third support (530).

6. The in-wheel motor according to claim 5, wherein the sealing apparatus (2) further comprises:
O-rings (710 and 720) disposed between the second bearing (620 and 630) and the third support (530); and
an O-ring (730) disposed between the encased seal (640) and the third support (530).

7. The in-wheel motor according to claim 1, wherein the motor body (1) comprises a main motor (100) and auxiliary motors (200 and 300) disposed on left and right sides thereof, the main motor (100) is provided as a radial flux motor in which a plurality of magnets (120) are arranged on an inner circumferential surface of a radial back iron (130), and the auxiliary motors (200 and 300) are provided as axial flux motors in which a plurality of magnets (220 and 320) are arranged on inner surfaces of axial back irons (230 and 330).

8. A sealing apparatus (2) provided in an in-wheel motor for an electric vehicle, wherein:
the in-wheel motor for the electric vehicle comprises a motor body (1) including a wheel hub (11) on one side;
the sealing apparatus (2) is mounted on the motor body (1) on the opposite side to the wheel hub (11); and
the sealing apparatus (2) comprises:
a first support (510) fixedly coupled to a motor shaft (14) of the motor body (1);
a second support (520) fixedly coupled to the motor shaft (14) and disposed outside the first support (520);
a third support (530) covering an outer surface of the first support (510) and an outer circumferential surface of the second support (520), and rotated when the motor is operated; and
a fourth support (540) coupled to an outer surface of the second support (520) and rotated when the motor is operated,
wherein the sealing apparatus (2) further comprises an encased seal (640) disposed between the second support (520) and the third support (530).

9. The seal apparatus (2) according to claim 8, wherein a plurality of first labyrinth forming protrusions (521a) are formed on the outer surface of the second support (520), a plurality of second labyrinth forming protrusions (541a) are formed on an inner surface of the fourth support (540), and the first labyrinth forming protrusions (521a) and the second labyrinth forming protrusions (541a) are arranged adjacent to each other and alternately arranged along a radial direction of the motor, so that a gap between the second support (520) and the fourth support (540) has a labyrinth structure (800).

10. The seal apparatus (2) according to claim 8, wherein the encased seal (640) comprises:
a case (643);
first and second sealing members (641 and 642) disposed in close contact with each other within the case (643);
a diaphragm (644) and a plurality of spring members 646 for elastically supporting the second sealing member (642); and
a grease (G) filled in an empty space between an inner surface of the case (643) and the diaphragm (644), and when the motor is operated, the grease (G) is automatically supplied to a seal joint surface between the first and second sealing members (641 and 642) by a pumping pressure generated by a vibration of the diaphragm (644) and the spring member (646).

11. The seal apparatus (2) according to claim 10, wherein a diamond-like carbon (DLC) coating film is coated on each of opposite surfaces of the first and second sealing members (641 and 642).

12. The seal apparatus (2) according to claim 8, wherein the sealing apparatus (2) further comprises:
a first bearing (610) mounted between the first support (510) and the third support (530); and
a second bearing (620 and 630) mounted between the second support (520) and the third support (530).

13. The seal apparatus (2) according to claim 12, wherein the sealing apparatus (2) further comprises:
O-rings (710 and 720) disposed between the second bearing (620 and 630) and the third support (530); and
an O-ring (730) disposed between the encased seal (640) and the third support (530).

* * * * *